United States Patent [19]

Rosenberger et al.

[11] 3,731,227

[45] May 1, 1973

[54] GAS LASER

[75] Inventors: Dieter Rosenberger; Alfred Hermann, both of Munich, Germany

[73] Assignee: Siemens Aktiengesellschaft, Berlin and Munich, Germany

[22] Filed: Mar. 30, 1972

[21] Appl. No.: 239,537

[30] Foreign Application Priority Data

Ap. 23, 1971 Germany.....................P 21 19 948.4

[52] U.S. Cl................................................331/94.5
[51] Int. Cl................................................H01s 3/02
[58] Field of Search .......................331/94.5; 330/4.3

[56] References Cited

UNITED STATES PATENTS 3,609,587  9/1971  Kolb et al............................331/94.5

OTHER PUBLICATIONS

Hernqvist, Stabilization of He–Cd Laser. Appl. Phys. Letters, Vol. 16, No. 11 (June 1, 1970) pp. 464–467.

*Primary Examiner*—William L. Sikes
*Attorney*—Carlton Hill et al.

[57] ABSTRACT

Condensation of metallic vapors on the cooler Brewster window ends of a laser tube during warm up and cool down periods are prevented by positioning a blocking member adjacent each end of the laser tube. The blocking members move from an operative position blocking the end of the laser tube to a position out of the path of the laser. In one embodiment the laser tube includes a lateral projection which receives the blocking member in its inoperative position. In another embodiment the blocking member is a curved disk having an outer diameter conforming to the cross sectional configuration of the tube and a transverse cross section generally conforming to the inner diameter of the laser tube.

9 Claims, 3 Drawing Figures

GAS LASER

BACKGROUND OF THE INVENTION

1. Field of the Invention

This invention generally relates to a gas laser apparatus and more particularly concerns a means for preventing condensation of the gas medium on the Brewster windows at the ends of the laser tube.

2. Prior Art

The typical gas laser construction comprises a cylindrical tube which is closed vacuum tight at its ends by means of Brewster windows. The tube contains an inverted gas medium, an optical resonator and an electric device causing the gas discharge. The coherent laser light is produced by the excitation of gaseous elements which may be metallic vapors.

To obtain maximum efficiency from the gas laser the active gases or vapors must have certain constant partial pressures. With metallic vapor these pressures can be advantageously obtained by heating the metal in a side arm of the tube to a predetermined temperature. Since the vaporization is caused by high temperatures it follows that if these vapors reach cooler places within the discharge tube and they are cooled sufficiently they will condense on the cooler surface. In an elongated gas laser discharge tube the temperature decreases from the normally heated central zone towards both ends. The problem thus arises that since the Brewster windows are arranged at the coolest portions of the tube, namely at the opposite ends, and since the laser radiation must pass through the Brewster windows, the radiation intensity emitted by the laser decreases sharply if the Brewster windows become dimmed by the condensation of the gases therein. This problem is especially acute in gas lasers which contain metallic vapors because of the fact that the metal, as opposed to the gases which are otherwise used in gas lasers, are able to condense at the temperatures which may occur at the cooler ends of the discharge tube.

The bad effects of this problem are known in the prior art. In an article entitled "Cataphoresis In The Helium-Cadmium Laser Discharge Tube," published in the Journal of Applied Physics in Volume 40, number 13 of December, 1969, T.P. Sosnowsky has proposed a solution to the problem. According to his solution two discharge paths are provided in the discharge tube of a helium-cadmium layer in such a way that the cathode is arranged in the center of the discharge tube and one anode is arranged at each respective end. The stock supply of material, say cadmium, which is to be evaporated, is positioned in two side arms of the discharge tube directly adjacent to the anodes. By this means the cadmium vapor is driven by positive ions in the direction toward the centrally located cathode. As a result, the number of metallic particles adjacent the Brewster windows is reduced and accordingly the problem of the rapid dimming of the Brewster plates may be safely avoided during operation.

This solution, however, fails to avoid the problem of condensation during the preliminary heating time and after the apparatus has been switched off with the result that fairly large amounts of cadmium still reach the Brewster windows through the well known phenomenon of vapor diffusion. Accentuating this problem is the fact that metallic vapor lasers have a somewhat longer heating time than those operated with a noble gas. During this heating time a vapor pressure corresponding to the cadmium evaporation temperature will result and it will deposit mainly at the coldest walls of the discharge tube, namely at the Brewster plates. The same is true after the gas laser has been switched off and until the cadmium, which was evaporated by the heating device, has cooled down to the surrounding temperature again.

SUMMARY OF THE INVENTION

By means of the invention hereinafter described the Brewster plate windows at both ends of the laser tube are fully protected against the problem of vapor condensation during operation as well as before and after operation. According to our invention the problems of the prior art are overcome by providing blocking elements arranged directly in front of the Brewster plate windows such that the blocking elements may be movable between a closed position in which they seal the Brewster plate windows off from the rest of the laser tube and an open position in which the Brewster windows are unobstructed. The blocking elements may take the form of tongues having an outer dimension conforming to the cross section configuration of the laser tube and a transverse cross sectional configuration conforming to about one-half the inner surface of the laser tube at that point. In this embodiment the blocking element takes the form of a generally curved eliptically shaped disk and is attached at an upper point to a suspension hinge within the tube. A magnetic coil arranged outside of the laser tube but whose forces will be transmitted through the tube serves to lift the lid structure from a first operative position where it blocks the tube to a second, inoperative position where it lies tightly against the upper portion of the laser tube adjacent the electromagnetic means.

In another embodiment the blocking element functions as a slide or gate valve the lower part of which has a shape of the discharge tube cross section and thus blocks it in a first operative position. In this case the laser tube includes a lateral projection adjacent to each Brewster window which receives the gate or slide therein when the slide is in its inoperative position out of the discharge tube. An electromagnetic coil surrounds the lateral projection and iron core member is connected with the slide so that the slide or gate may be moved between the operative and inoperative positions by energizing the coil in accordance with well known electrical principles.

By means of the blocking elements according to our invention the metallic vapor is prevented from reaching the cooler portions of the discharge tube and hence the problems of vapor condensation in the prior art have been economically and efficiently overcome.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which.

DESCRIPTION OF THE PREFERRED EMBODIMENT

Figure 1:
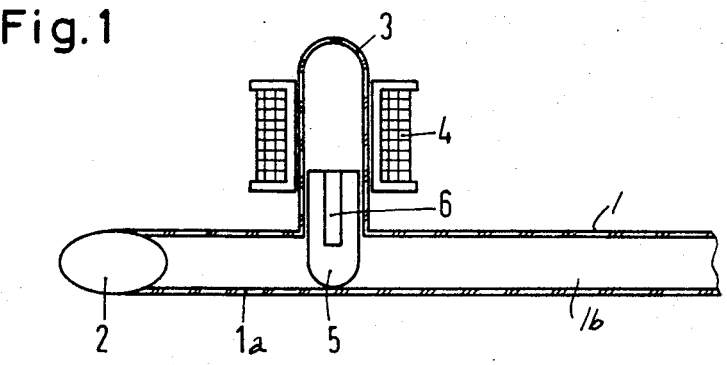
FIG. 1 is a schematic cross sectional view of one end of a gas laser discharge tube illustrating the lateral projection which receives a gate or slide blocking element and is operated by a surrounding electromagnetic coil.

By referring to FIG. 1, there may be seen an embodiment of our invention in which the blocking element functions as a slide or a gate valve 5 to slide into position, blocking the cross-section of a gas laser tube 1 and thereby isolating a cooler end of the tube 1a having a Brewster window 2 therein from the more central portion of the tube 1b. In this embodiment, the laser tube 1 includes a lateral projection 3 adjacent to each Brewster window 2. The lateral projection 3 is of such a size and configuration to receive the movable slide or gate therein when the slide member 5 is in its inoperative position out of the main portion of the discharge tube 1. The particular location of the slide will depend upon the expected temperature differentials between the end of the tube 1a and the central portion 1b, as well as other factors such as the vaporization temperature of the metallic vapors.

An electromagnetic coil 4 surrounds the lateral projection 3 and an iron core means 6 is connected with the slide means 5 so that the slide or gate means 5 may be moved between the operative position shown and an inoperative position out of the cylindrical configuration of the tube 1, in accordance with well-known electrical principles by the energization of the coil 4. Thus, when the magnetic coil is switched on, a power is exerted into the iron core, and thus onto the slide and the slide is moved upwardly whereby the laser beam is enabled to emerge from the Brewster window 2. After the magnetic coil 4 has been switched off, the slide member 5 falls back into the elongated portion of the discharge tube 1, either by gravity or by suitable resilient means and closes off the portion 1a of the discharge tube from the portion 1b of the discharge tube. The lower part of the slide 5 has the shape of the discharge tube cross section, and thus serves to block it completely. Suitable seals may be provided in the lateral projection 3 to prevent movement of gas through that portion and between the portions 1a and 1b. It will be understood by those skilled in the art that FIG. 1 is schematic and for purposes of illustration only.

Figure 2:
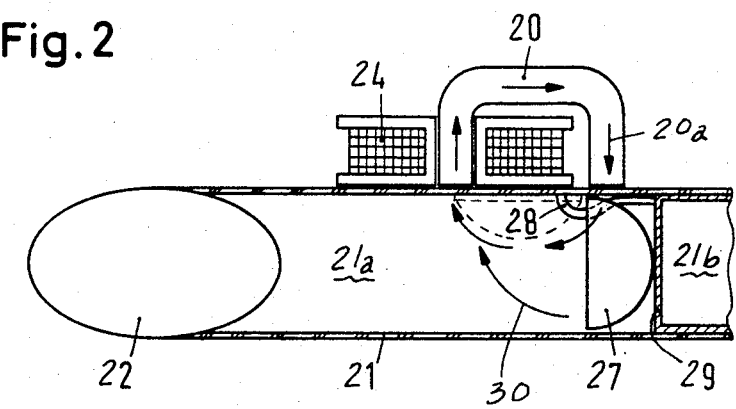
FIG. 2 is a schematic cross sectional view of one end of a gas laser tube illustrating another embodiment of our invention wherein the blocking element is a disk-like means which may be swung from a position blocking the discharge tube to a position tight against the discharge tube wall by an electromagnetic means; and, FIG. 3 is an isolated perspective view of the blocking element of FIG. 2.
Figure 3:
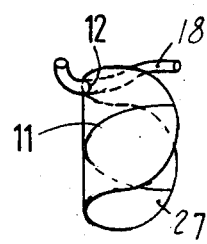

In FIG. 2, one end of a discharge tube 21 is again shown with a Brewster window 22 and a blocking element 27 separating the tube 21 into a normally cooler end portion 21a and a normally warmer central portion 21b. In this embodiment, the Brewster window 22 is protected by a configured tongue or lid 27 having an outer dimension conforming to the cross-sectional configuration of the laser tube 21 and a transverse cross-sectional configuration, as may be seen by the line 11 in FIG. 3, conforming to about one-half the inner surface of the laser tube 21 at the point where the closure member 27 is to be positioned.

The closure means 27 is mounted in the inside of the tube 21 by means of a suspension hinge 28 which suspension hinge has a portion attached at a hinge support 29 within the tube. By referring to FIG. 3, it may be seen that the suspension hinge 28 passes through a bore 12 in the closure member 27. In practice, we have found that an elliptically shaped nickel sheet which is bent in such a way that the large axis of the ellipse 11 scribes a half circle and that the closure member 27 has the shape of a half circle when viewed from the side, provides a very effective means for blocking the tube 21 when it is in its first operative position as shown in full lines in FIG. 2 and in completely opening the tube 21 when it is in its inoperative second position held tightly against the upper portion of the tube 21 as shown in dotted lines in FIG. 2. Thus, because of the shape of the closure member 27, the end portion 21a of the discharge tube 21 is tightly closed off from the central portion 21b when the lid 7 is in its operative position. On the other hand, when the closure lid 27 is in a second inoperative position tightly pressed against the wall of the tube 21, the tube is in a completely operative condition.

Movement of the closure member 27 is effected by positioning a coil 24 outside of the laser tube 21 adjacent to the closure member 27 and providing an iron core means 20 to transmit the magnetic field as shown by the arrows 20a. When the coil 24 has been turned on, the closure member 27, being of a magnetically affected substance, is moved upwardly in a direction of the arrow 30 about the hinge means 28 to a position as shown in dotted lines where it is tightly pressed against the inside of the laser tube 21. Similarly, when the coil 24 has been turned off, the closure member 27 will fall downwardly either by the force of gravity or by a suitable resilient means into the position shown to again tightly close off the portion 21a of the tube 21 from the portion 21b.

By means of the structures illustrated in FIGS. 1 and 2, the problem of condensation of gas vapors during the preliminary heating time and after the laser apparatus has been switched off has been simply and effectively overcome by effectively blocking off the cooler end portions of the laser tube during these critical periods. With the central portion of the tube 1b and 21b warmed up, the ends portions 1a and 21a will increase in temperature by conduction, convection and radiation so that by the time the blocking elements 5 and 27 are opened, the end portions will be warmed up to the point where condensation will not occur. As a result, the Brewster windows 2 and 22 will remain clear and undimmed, so that the maximum effect of the laser apparatus will be achieved. It will be understood that each end of the laser tubes 1 and 21 respectively will have a blocking element. Moreover, the principles of this invention may be applied in such numbers and positions in the laser tube as required to carry out the object of this invention.

Although minor modifications might be suggested by those versed in the art, it should be understood that we wish to embody within the scope of our invention warranted hereon all such modifications as might reasonably and properly come within the scope of our contribution to the art.

We claim:

1. A gas laser tube closed at its opposite ends by Brewster windows containing an active gas and including blocking elements positioned adjacent each of the Brewster windows, each of said blocking elements being movable between a closed position in which it seals a respective end portion of said tube from the remainder of said laser tube and an open position in which it does not obstruct the laser tube.

2. A gas laser tube according to claim 1 wherein the blocking elements are tongues hinged adjacent one end and swingable within said laser tube between said open and closed positions.

3. A gas laser tube according to claim 2 wherein each said tongue has an outer diameter conforming to the cross sectional configuration of said laser tube, and wherein said tongue has a cross section conforming to a portion of said laser tube outer diameter.

4. A gas laser tube according to claim 3 including an electromagnetic coil and core means outside of said laser tube at a point adjacent a position of said blocking element whereby when said coil is energized, said blocking element will be moved from its closed position in which it blocks said laser tube to its open position wherein said laser tube is unobstructed.

5. A gas laser tube construction according to claim 4 wherein said blocking element pivots about a suspension hinge engaging said blocking element at one end, said suspension hinge being supported internally of said laser tube.

6. A gas laser tube construction according to claim 1 wherein the blocking element is a slide means which moves generally linearly transversely to the central axis of said laser tube.

7. A gas laser tube according to claim 6 wherein said laser tube includes a lateral projection adjacent to each Brewster window, said slide means being received in said lateral projection whereby said slide means may move from a first operative position blocking said laser tube to a second inoperative position received in said lateral projection.

8. A gas laser tube according to claim 7 including an electromagnetic coil surrounding said lateral projection, said blocking means having an iron core member associated therewith and positioned relative to said electromagnetic coil whereby when said coil is energized said slide means is urged to said second position.

9. A gas laser tube according to claim 1 wherein said active gas is a metallic vapor.

* * * * *